April 3, 1928.  G. FLINTERMANN  1,664,879
BEARING
Filed May 24, 1926
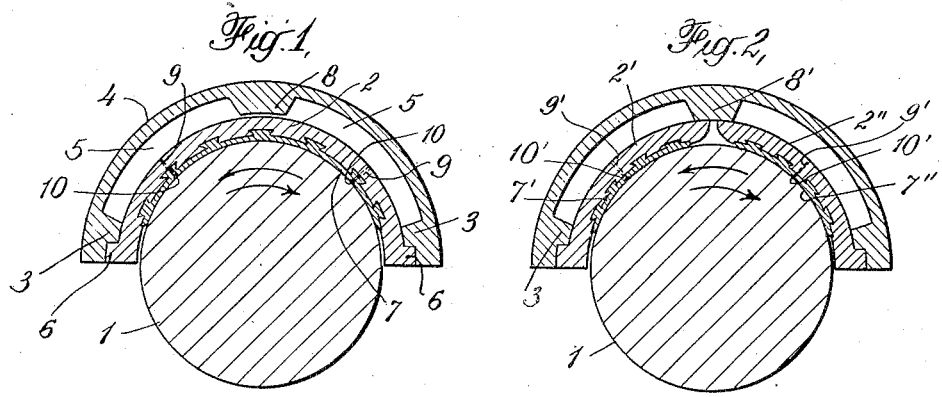
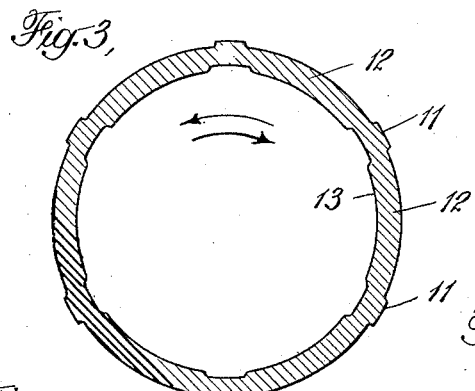
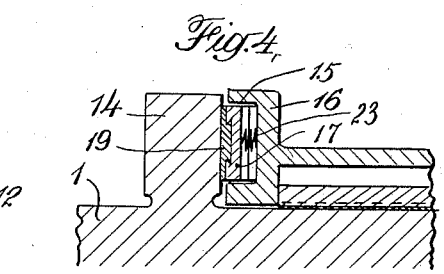
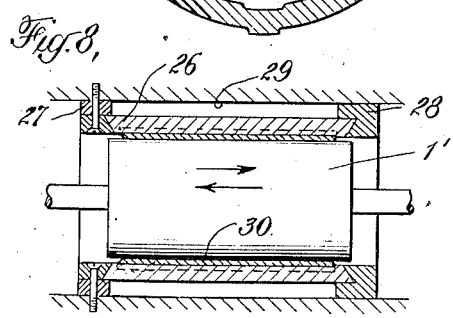
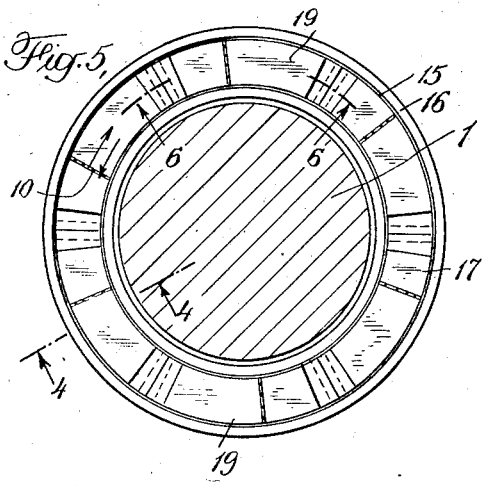
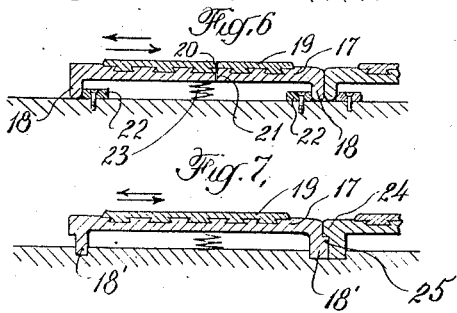
INVENTOR
Gerhard Flintermann
BY
ATTORNEYS Patented Apr. 3, 1928.

1,664,879

UNITED STATES PATENT OFFICE.

GERHARD FLINTERMANN, OF WEST ORANGE, NEW JERSEY.

BEARING.

Application filed May 24, 1926. Serial No. 111,427.

This invention relates to improvements in bearings and is applicable to bearings of practically all types, such as thrust bearings, journal bearings, slide bearings, vehicle bearings and crank pin and crank shaft bearings. More particularly, the invention relates to bearings of that type in which the movement of the moving member tends to produce and maintain a wedge-shaped body of oil between a surface of the bearing and the surface of the moving member.

While attempts have been made to produce a bearing in which such wedge-shaped bodies of oil will be produced and maintained, these attempts have not been wholly successful due mainly to the fact that the bearing shoes or bearing projections heretofore employed have not yielded in the proper way and to the proper degree to favor the formation of the wedge-shaped bodies of oil. In various copending applications I have disclosed different types of bearings so designed that the wedge-shaped bodies of oil are readily formed and maintained. According to this invention the bearing is so designed that the wedge-shaped bodies of oil will be readily formed and maintained in either direction of movement of the moving member. In contradistinction to bearings heretofore proposed and in order to facilitate the formation and maintenance of the wedge-shaped bodies of oil, the bearing projections are mounted or formed directly on yielding bearing elements in such a way that the bearing projection yields with the yielding portion of the element and partakes of its flexure and does not materially interfere with the flexing and yielding of such yielding portion of the bearing element.

The main object of the invention is to provide a bearing of increased efficiency in which one or more wedge-shaped bodies of oil will be formed between one or more surfaces of the bearing projections and the surface of the moving member, in either direction of movement of the moving member, such wedge-shaped bodies of oil being more readily formed and maintained than in bearings heretofore proposed.

Certain other objects will appear from the following description.

The accompanying drawings illustrate the invention as applied to several different types of bearings.

In the drawings:

Fig. 1 is a transverse section of a journal or axle bearing constructed in accordance with the invention and which is especially adapted for use on vehicles such as locomotives and the like;

Fig. 2 is a transverse section showing a modification of the type of bearing illustrated in Fig. 1;

Fig. 3 is a transverse section of a bearing bushing constructed in accordance with the invention and which is particularly adapted for use in crank shaft or crank pin bearings;

Fig. 4 is a transverse section through a thrust bearing constructed in accordance with the invention the section being taken on line 4—4 of Fig. 5;

Fig. 5 is a face view of the thrust bearing shown in Fig. 4;

Fig. 6 is a partial circumferential section taken on the line 6—6 of Fig. 5;

Fig. 7 is a view corresponding with Fig. 6, but illustrates a modified form of bearing element, and Fig. 8 is a longitudinal section of a slide bearing constructed in accordance with the invention.

In the bearing illustrated in Fig. 1 the moving member is represented at 1 and may be, for instance, the journal portion of a vehicle axle. The bearing element comprises a bushing section 2 which is supported at its ends by projections 3 formed on the bearing housing 4. The projections 3 space the major portion of the bushing 2 away from the housing 4 to provide a clearance 5 between the bushing and the housing. If desired, the ends of the bushing 2 may be provided with projections 6 which engage in correspondingly shaped recesses in the housing to anchor the ends of the bushing to the housing. The bushing 2 may be made of steel, brass or any other suitable material and is so designed that it will yield or deflect in the manner hereinafter described, the clearance 5 in back of the bushing being provided to allow for such deflection. The bushing 2 is provided with a facing 7 which is preferably of Babbitt metal. The Babbitt metal constitutes a bearing pad which is set in and anchored to the bushing in the manner shown in the drawing. The bearing pad 7 is so positioned on the bushing that its ends terminate short of the supports, i. e. they do not overlap the projections or supports 3 and so that one end of the pad extends the same distance toward the corresponding support as the other end of the pad extends towards its support. In other words, the pad 7 is located midway between the supports on which the bushing is mounted, or otherwise expressed, is located centrally of the supports or symmetrically disposed with respect to them.

If desired, the housing may be provided with a projection 8 which normally does not contact with the bushing section 2 but into engagement with which the bushing section may move if the bearing is subjected to an overload. In other words, the projection 8 serves as a stop to limit the deflection of the center portion of the bushing. The bushing section 2 is preferably provided with two sets of oil ducts 9 located approximately in the positions shown in the drawing, and the face of the Babbitt pad 7 is provided with a groove 10 for each set of ducts. Each groove extends transversely across the pad and communicates with the corresponding oil ducts 9.

The operation of this type of bearing is as follows. Assume the member 1 rotates in an anti-clockwise direction and that oil is fed to the bearing in any suitable way. The oil forced through the ducts 9 or drawn through them by the rotation of the member 1 is forced along in the direction of rotation and deflects the bushing 2 in such a way as to form a wedge-shaped pocket between the surface of the pad 7 and the surface of the rotary member 1. This pocket is filled with lubricant and reduces the friction between the bearing pad and the rotary member as it virtually tends to force the two apart. This wedge-shaped body of oil will extend from the right hand set of ducts 9 toward the left end of the pad 7 with the wide or entrance end of the wedge-shaped space in the vicinity of the right hand oil ducts. If the member 1 rotates in the opposite direction the wedge-shaped body of oil will be formed as before because the pad 7 is symmetrically disposed with respect to the supports, but in this instance the oil wedge will extend from the left hand set of ducts 9 toward the right end of the pad 7 with the wide or entrance end of the wedge-shaped space in the vicinity of the left hand oil ducts 9. It will therefore be seen that the oil wedge will be formed and maintained in either direction of rotation of the member 1.

The pad 7 being made of Babbitt metal will yield with the bushing section 2 and will partake of its flexure. For this reason the pad 7 should be made quite thin so that it will not interfere with the proper flexing of the bushing. Of course, the pad 7 may be made of any other suitable material and may even constitute an integral projection on the bushing section 2, as in a modification to be later described, provided it still yields with the bushing and partakes of its flexure and does not materially interfere with the yielding of the bushing.

Figure 2 shows a bearing of the same general character as that shown in Fig. 1 except that the bushing section is divided into two parts 2' and 2''. The central projection 8' on the housing in this instance forms a support at all times for the adjacent ends of the bushing sections. The bushing section 2' has a bearing pad or bearing projection 7' and the bushing 2'' has a similar bearing pad or bearing projection 7''. The bearing projection 7' extends the same distance towards the support 3 that it extends toward the support 8' and the same is true of bearing projection 7''. Each of the bearing pads is provided with a transverse groove 10' located about midway between its ends and these grooves are supplied with oil through the oil ducts 9'. In the operation of this type of bearing when the member 1 is rotating in an anti-clockwise direction a wedge-shaped body of oil will be formed between the groove 10' in the pad 7' and the left hand end of this pad, and at the same time a similar oil wedge will be formed between the groove 10' in the bearing pad 7'' and the left hand end of this pad. If the member 1 rotates in the opposite direction a wedge-shaped body of oil will be formed between the groove 10' in the bearing pad 7' and the right hand end of this pad, and a similar wedge-shaped body of oil will be formed between the groove 10' in the bearing pad 7'' and the right hand end of this pad. In either case the wide or entrance ends of the wedge-shaped spaces will be in the vicinity of the oil grooves and the small ends will be further along the pad in the direction of rotation.

Figure 3 shows a bearing bushing adapted to be mounted in a housing in such a way that projecting feet 11 serve to space the intervening portions 12 of the bushing away from the housing. Between every two projecting feet 11 there is a relatively thin bearing projection 13 each of which is arranged with respect to the supports 11 in the same way that the bearing projections are arranged in Figures 1 and 2. In this case the bearing projections are made integral with the portions 12. The bushing may be made of steel, brass or the like, or it may be made entirely of any other suitable bearing metal. The portions 12 of the bushing between the supports 11 are adapted to yield and the projections 13 are so designed that they do not materially interfere with the yielding and deflection of such portions 12. The oil may be fed to the bearing in any suitable way and for an anti-clockwise direction of rotation of the member 1 the oil will enter the space between each bearing projection and the surface of the member 1 at the right hand end of each bearing projection and an oil wedge will be formed under each bearing projection with the small end of the wedge toward the left hand extremity of each bearing projection and the large end of the wedge toward the right hand extremity of each bearing projection and the large end of the wedge toward the right hand extremity of each bearing projection. For a clockwise direction of rotation of the member 1 the wedges will be formed with their large ends toward the left hand extremities of the bearing projections, and their small ends toward the right hand extremities of the bearing projection. The bushing is shown in Fig. 3 as being in one piece and continuous and may be used in this form where it is possible to slip it over the end of the shaft. However, it may be divided into two or more parts to facilitate assembling if so desired.

Figs. 4, 5, and 6 show a thrust bearing operating on the same principle. In this case the rotary member 1 has a flange 14 which abuts against the bearing elements mounted in a recess 15 of a stationary member 16. Each of the bearing elements comprises a bridge-like plate 17 (Fig. 6) having supporting feet 18 at its extremities to space the intervening portion of the plate away from the bottom of the groove 15. The portion of each plate between the supports is adapted to yield as in the other figures and each plate carries a bearing projection 19 which may be a pad of Babbitt metal set in and anchored in the plate. Each bearing pad is symmetrically disposed with respect to the supports 18 as in the other figures. Each bearing pad may be provided, if desired, with an oil groove 20 to which oil is fed by the oil ducts 21 passing through the thickness of the plate. The bearing elements may be held against longitudinal movement by stop plates 22 secured to the bottom of the groove 15 and which abut against the supporting legs 18. If the bearing elements are mounted in a vertical plane it may be desirable to hold each of them in place by suitable means such as a coil spring 23 secured at one end to the bottom of the groove 15 and secured at its other end to the bottom of the plate 17. In one direction of rotation of the member 1 the oil wedge will be formed between the groove 20 and the left hand end of each bearing pad and in the other direction of rotation of the member 1 the oil wedge will be formed between the groove 20 and the other end of each bearing pad. It will be noted from Fig. 6 that the oil grooves 20 are not placed exactly in the center of each bearing pad. This may be desirable, for instance, where the moving member will operate in one direction most of the time. The groove 20 and its oil ducts 21 may be so located in such a case that the most efficient oil wedge will be produced for that particular direction of rotation in which the moving member operates during the major part of the time. The bearing plates 17 are arranged in a circular series as shown in Figure 5 and any suitable number of the plates may be used to make up the series.

If desired, the oil groove 20 and the oil ducts 21 may be omitted as shown in Figure 7 in which case oil will enter at one end of each bearing pad and will leave at the other end. However, in the type of bearing disclosed herein the oil ducts may perform an important part in increasing the efficiency of the bearing for the following reasons. Inasmuch as each bearing surface is supported at its forward and rear ends the deflection of the bearing element will, during movement of the moving member, produce a clearance between the bearing surface and the surface of the moving member which is thickest near its central portion and thinnest near its oil entering and leaving edges. Therefore, if the lubricant has to be fed to this clearance at one end it must pass through an opening which is so small, when the bearing is heavily loaded, that sufficient lubricant may not be fed through the entrance opening to make the bearing operate efficiently. In a bearing of this type there may be considerable leakage of lubricant from the sides of the bearing element, this leakage being commonly referred to as "end leakage", and if the supply of lubricant through the small entrance opening is too restricted most of the lubricant will be lost by end leakage and not enough will accumulate near the leaving end of the clearance during heavy loads to produce an efficient oil wedge near this point. When at least one oil duct is provided for supplying the lubricant near the thickest part of the clearance the lubricant is admitted more freely and as the distance from the point where the lubricant is admitted to the leaving end of the clearance is much shorter, there is less opportunity for end leakage of the lubricant. The result is that sufficient lubricant will be maintained near the leaving end of the clearance to form itself into an efficient oil wedge that will prevent metal to metal contact at the leaving edge of the bearing surface because enough lubricant will reach this point. It is the lubricant at this point that completes the separation of metal from metal. Another advantage of this arrangement is that the length of the oil wedge itself is reduced. The shorter the oil wedge the more efficient is the bearing because the internal friction in the lubricant is not so great. The close approach of the metal surfaces at the extreme forward end of the clearance serves to keep the forward half or forward portion of the clearance almost free from lubricant or at least only partly filled. Nevertheless, the metal surfaces at this part of the clearance are separated because the short oil wedge at the leaving end of the clearance deflects the plate in such a way as to form a clearance which has the general shape, in longitudinal cross section, of a sector of a circle. If the bearing element is deflected in such a way that the clearance is wedge-shaped throughout, that is, smallest at its leaving end and widest at entrance end, this result would not be accomplished because an abundant supply of lubricant would then be admitted at the extreme forward end of the clearance thus causing the formation of a relatively long and inefficient oil wedge. The lubricant may be fed to the ducts by any suitable means. In the modification of Figure 7 the bearing elements are interlocked by providing a shoulder 24 at one end of each element which engages over a corresponding shoulder 25 at the adjacent end of an adjoining element.

Figure 8 shows a slide bearing for a reciprocating member 1'. It may comprise one or more bushing sections 26 having end supports 27 and 28 which serve to space the intervening portion of the bushing away from the housing 29. The bushing 26 is provided with a bearing projection 30 which may, if desired, be in the form of a Babbitt pad set into the bushing. If the bushing 26 is made up of several sections then the Babbitt member 30 will be divided into a corresponding number of sections. The pad is symmetrically disposed with respect to the supports and in either direction of rotation of the member 1' an oil wedge will be formed between the surface of the bearing projection and the surface of the member 1''. In Figure 8, as in the other figures, the portion of the bushing between the supports 27 and 28 is adapted to yield and flex to permit the formation of the wedge-shaped body of oil.

In all of the figures described above the bearing projection whether formed by a separate pad of Babbitt metal or the like or whether made integral with the yielding section of the bearing element, is so designed that it will yield with the yielding section of the bearing element and will partake of its flexure. The bearing projections being located midway between the points at which the bearing element is supported, or in other words being symmetrically disposed with respect to the supports, the bearing may be used for either direction of rotation or movement of the moving member and regardless of the direction of rotation or movement of such member, a wedge-shaped body of oil will be formed between the surface of each bearing projection and the surface of the moving member and this oil wedge will exist somewhere between the extremities of each bearing projection.

The reason I prefer to position the bearing pads so that their ends do not overlap the supports is to facilitate the deflection of the bearing elements between the points of support. In other words this insures that all forces tending to deflect the elements will be transmitted to them between the points of support.

I have described the bearing projection or pad as being located midway between the supports, or symmetrically disposed with respect to them, because this will produce the most efficient type of bearing for both directions of rotation and is the preferred form of bearing. However, even though the bearing projection or pad is not exactly midway between the supports a wedge-shaped body of oil will be formed in either direction of movement of the moving member provided the bearing projection or pad extends a substantial distance on either side of the center line of the yielding plate which supports it. A bearing having the bearing projections so located may be efficient enough for some purposes especially when the moving member moves in one direction most of the time, because if there is a difference in the efficiency of the oil wedges, the bearing may be made to operate so that the most efficient wedge will be produced for that direction in which the moving member operates most of the time.

This application is a continuation in part of my application Serial No. 46,548 filed July 28, 1925.

I claim:

1. A friction bearing comprising two members one of which is movable relative to the other, a bearing element located between said members and having a yielding portion, means for supporting said yielding portion at two points spaced apart in the direction of movement of the moving member to provide a clearance under the yielding portion, said yielding portion having a bearing projection the surface of which is in relative sliding engagement with the surface of the moving member and each end of which terminates short of the corresponding point of support, said bearing projection extending the same distance toward one of the points of support as towards the other and being adapted to yield with such yielding portion of the bearing element and to partake of its flexure.

2. A bearing in accordance with claim 1 in which the bearing projection comprises a pad of Babbitt metal secured to the yielding portion of the bearing element.

3. A friction bearing comprising two members one of which is movable relative to the other, a bearing element located between said members and supported at at least two points spaced apart in the direction of movement of the moving member to provide a clearance under the bearing element between the points of support, the portion of the bearing element between the points of support being adapted to yield and said portion of the bearing element between the points of support having a bearing projection the surface of which is in relative sliding engagement with the surface of the moving member and each end of which terminates short of the corresponding point of support, the relation between one end of the bearing projection and the corresponding point of support being the same as the relation between the other end of the bearing projection and the corresponding point of support, and said bearing projection being adapted to yield with said yielding portion of the bearing element and to partake of its flexure.

4. A friction bearing comprising two members one of which is movable relative to the other, a bearing element located between said members and having a yielding portion, means for supporting said yielding portion at its forward and rear ends to provide a clearance under the yielding portion, and a bearing projection located midway between the supporting means the surface of which is in relative sliding engagement with the surface of the moving member and said bearing projection being adapted to yield with the yielding portion of the bearing element and to partake of its flexure.

In testimony whereof I affix my signature.

GERHARD FLINTERMANN.